(12) United States Patent
Riedijk et al.

(10) Patent No.: US 10,474,873 B2
(45) Date of Patent: Nov. 12, 2019

(54) FINGERPRINT SENSING USING MEASURING CONFIGURATIONS WITH DIFFERENT PRINCIPAL DIRECTIONS OF EXTENSIONS

(71) Applicant: Fingerprint Cards AB, Göteborg (SE)

(72) Inventors: Frank Riedijk, Delft (NL); Wouter Brevet, Delft (NL); Hans Thörnblom, Kungsbacka (SE); Christer Jansson, Linköping (SE)

(73) Assignee: Fingerprint Cards AB, Göteborg (SE)

( * ) Notice: Subject to any disclaimer, the term of this patent is extended or adjusted under 35 U.S.C. 154(b) by 86 days.

(21) Appl. No.: 15/806,834

(22) Filed: Nov. 8, 2017

(65) Prior Publication Data
US 2018/0137324 A1    May 17, 2018

(30) Foreign Application Priority Data
Nov. 17, 2016 (SE) ...................... 1651502

(51) Int. Cl.
*G06K 9/28* (2006.01)
*G06K 9/00* (2006.01)
*G01D 5/24* (2006.01)

(52) U.S. Cl.
CPC .............. *G06K 9/001* (2013.01); *G01D 5/24* (2013.01); *G06K 9/0002* (2013.01)

(58) Field of Classification Search
CPC ............. G06K 9/0002; G06K 9/00006–0012
See application file for complete search history.

(56) References Cited

U.S. PATENT DOCUMENTS 7,864,992 B2    1/2011    Riedijk et al.
8,888,004 B2    11/2014   Setlak et al.
(Continued)

FOREIGN PATENT DOCUMENTS

CN          104408410 A        3/2015

OTHER PUBLICATIONS

Swedish Search Report for Swedish Application No. 1651502-5 dated May 19, 2017, 3 pages.

*Primary Examiner* — Brian Werner
(74) *Attorney, Agent, or Firm* — RMCK Law Group, PLC

(57) ABSTRACT

A method of determining a representation of a fingerprint pattern of a finger using a fingerprint sensor comprising a two-dimensional measuring arrangement including a plurality of measuring elements, each comprising a finger electrode spaced apart from the finger by a dielectric structure. For each measurement position, the method comprises the steps of: providing a first measuring element configuration with an elongated first measuring arrangement portion having a first principal direction of extension; and a first peripheral measuring arrangement portion; acquiring a first measurement value for the measurement position; providing a second measuring element configuration having an elongated second measuring arrangement portion having a second principal direction of extension; and a second peripheral measuring arrangement portion; and acquiring a second measurement value for the measurement position. The representation of the fingerprint pattern is determined based on the first measurement value and the second measurement value for each of the measurement positions.

14 Claims, 12 Drawing Sheets

(56) References Cited

U.S. PATENT DOCUMENTS

| | | |
|---|---|---|
| 2012/0085822 A1 | 4/2012 | Setlak et al. |
| 2012/0242635 A1 | 9/2012 | Erhart et al. |
| 2016/0012271 A1 | 1/2016 | Hansen et al. |
| 2016/0063301 A1 | 3/2016 | Wu |
| 2016/0092018 A1* | 3/2016 | Lee .................. G06F 21/32 |
| | | 345/173 |
| 2016/0227142 A1 | 8/2016 | Lin |
| 2017/0053150 A1* | 2/2017 | Lee .................. G06K 9/0002 |

* cited by examiner

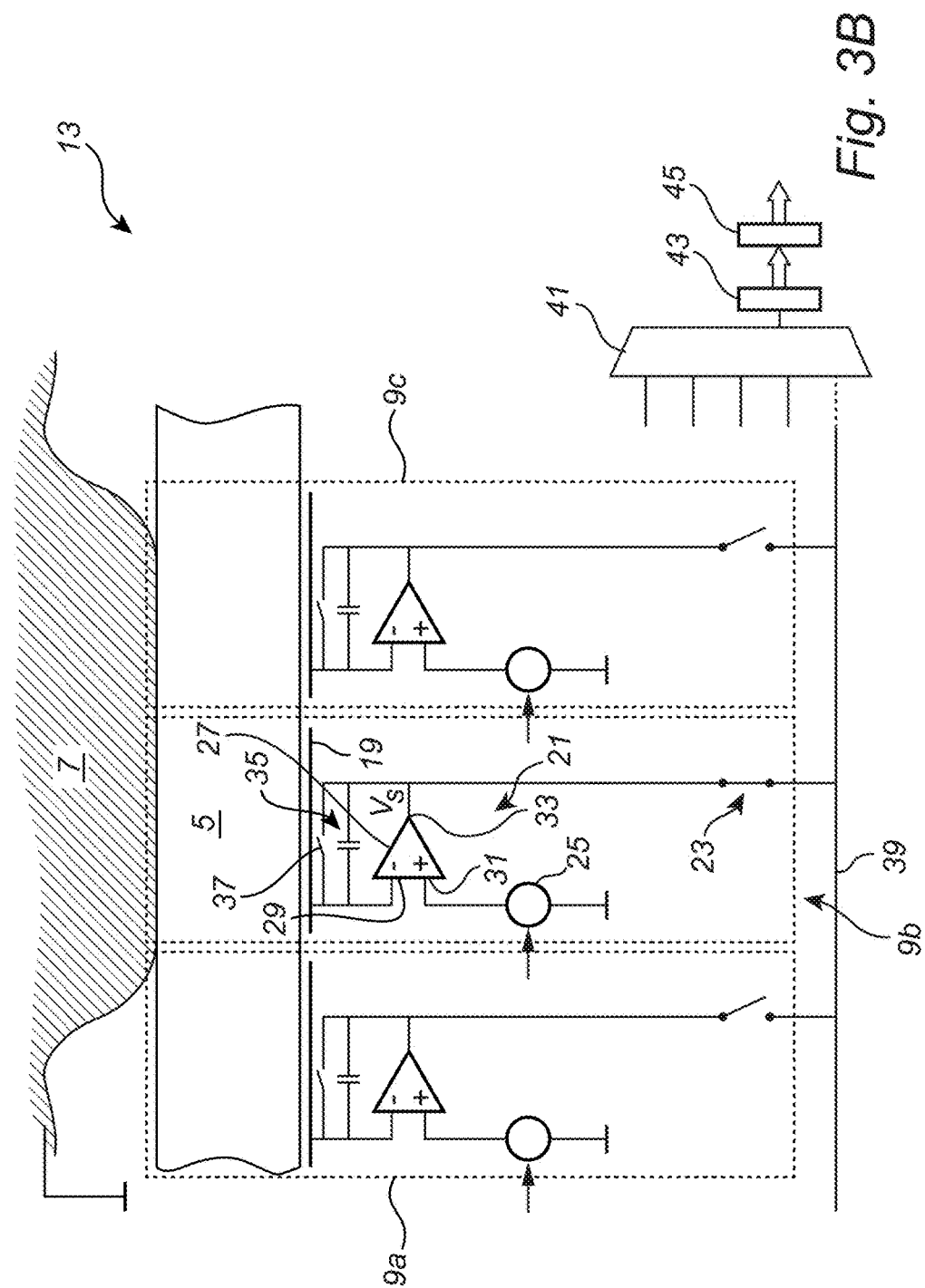

FINGERPRINT SENSING USING MEASURING CONFIGURATIONS WITH DIFFERENT PRINCIPAL DIRECTIONS OF EXTENSIONS

CROSS REFERENCE TO RELATED APPLICATIONS

This application claims priority to Sweden Application No. 1651502-5, filed on Nov. 17, 2016, the disclosure of which is incorporated herein by reference in its entirety.

FIELD OF THE INVENTION

The present invention relates to a method of determining a representation of a fingerprint pattern, and to a fingerprint sensor.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, acoustic, thermal etc), capacitive sensing is most commonly used, in particular in applications where size and power consumption are important issues.

Capacitive fingerprint sensors generally provide a measure indicative of the capacitance between each of several sensing structures and a finger placed on or moved across the surface of the fingerprint sensor.

Some capacitive fingerprint sensors passively read out the capacitance between the sensing structures and the finger. This, however, requires a relatively large capacitance between sensing structure and finger. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a capacitive fingerprint sensing system in which a driving signal is injected into the finger by pulsing a conductive structure arranged in the vicinity of the sensor array and measuring the resulting change of the charge carried by the sensing structures in the sensor array.

This type of so-called active capacitive fingerprint sensing systems generally enable measurement of the capacitance between finger and sensing structures with a much higher signal-to-noise ratio than the above-mentioned passive systems. This, in turn, allows for a considerably thicker protective coating and thus for more robust capacitive fingerprint sensors that can be included in items subjected to considerable wear, such as mobile phones.

For even further increased robustness and ease of integration of the fingerprint sensor into electronic devices etc, it is, however, desirable to enable fingerprint sensing through a very thick dielectric structure, which may be several hundreds of microns thick. For instance, it may be desirable to enable fingerprint sensing through a glass plate or similar, such as the front glass cover of a mobile phone.

When sensing through such a thick dielectric structure, the actual resolution of the resulting fingerprint image may be reduced since the area of the finger seen by each sensing structure is increased.

To mitigate this problem, U.S. Pat. No. 8,888,004 proposes to reconstruct shape information from differential pixel measurements using a kernel-based reconstructing process.

Although the approach proposed by U.S. Pat. No. 8,888,004 may be potentially useful for sharpening the fingerprint image, the suggested solution requires the fingerprint sensor to be capable of programmable differential pixel measurements. Furthermore, the suggested solution is expected to be rater complex and difficult to implement in practice.

SUMMARY

In view of the above-mentioned and other drawbacks of the prior art, it is an object of the present invention to provide for improved fingerprint sensing, in particular through a thick dielectric structure.

According to a first aspect of the present invention, it is therefore provided a method of determining a representation of a fingerprint pattern of a finger using a fingerprint sensor comprising a two-dimensional measuring arrangement including a plurality of measuring elements, each comprising a finger electrode spaced apart from the finger by a dielectric structure, the method comprising the steps of, for each measurement position in a plurality of measurement positions: providing a first measuring element configuration comprising: a first set of sensing measuring elements defining a first measuring arrangement portion including the measurement position and having a first principal direction of extension, the finger electrode of each measuring element in the first set of sensing measuring elements exhibiting a first time-varying sensing finger electrode potential; and a first set of peripheral measuring elements defining a first peripheral measuring arrangement portion at least partly surrounding the first measuring arrangement portion, the finger electrode of each measuring element in the first set of peripheral measuring elements exhibiting a first peripheral finger electrode potential different from the first sensing finger electrode potential; acquiring, using the first measuring element configuration, a first measurement value for the measurement position; providing a second measuring element configuration comprising: a second set of sensing measuring elements defining a second measuring arrangement portion including the measurement position and having a second principal direction of extension different from the first principal direction of extension, the finger electrode of each measuring element in the second set of sensing measuring elements exhibiting a second time-varying sensing finger electrode potential; and a second set of peripheral measuring elements defining a second peripheral measuring arrangement portion at least partly surrounding the second measuring arrangement portion, the finger electrode of each measuring element in the second set of peripheral measuring elements exhibiting a second peripheral finger electrode potential different from the second sensing finger electrode potential; acquiring, using the second measuring element configuration, a second measurement value for the measurement position wherein the method further comprises the steps of: determining a combined measurement value for each of the measurement positions based on the first measurement value and the second measurement value for each of the measurement positions; and determining the representation of the fingerprint pattern based on the combined measurement value for each of the measurement positions.

The representation of the fingerprint pattern of the finger need not necessarily be a digital gray scale image, but may be any suitable representation from which fingerprint pattern information can be deduced. The representation of the fingerprint pattern may, for example, be raw fingerprint image data, or the data may have been processed and may then be provided in the form of conditioned image data, as fingerprint template data or in any other form.

The finger electrode of each measuring element may, for example, be provided in the form of a metal plate. It should, however, be noted that the finger electrode may be realized as any suitable electrically conductive structure.

The measuring elements may be arranged in any suitable two-dimensional measuring arrangement, such as a planar array in which the measuring elements are arranged in rows and columns. There may, however, be embodiments in which the measuring elements are not arranged in rows and columns.

In embodiments where the measuring elements are arranged in rows and columns, the first principal direction of extension may, for instance, be parallel to the columns, and the second principal direction of extension may, for instance, be parallel to the rows.

That the first (second) measuring arrangement portion is elongated should be understood to mean that it is longer (along its respective principal direction of extension) than it is wide (dimension in a direction perpendicular to the respective principal direction of extension). In embodiments, the first (second) measuring arrangement portion may be, for example, at least eight measuring elements long and three or less measuring elements wide.

The first time-varying sensing finger electrode potential, the first peripheral finger electrode potential, the second time-varying sensing finger electrode potential, and the second peripheral finger electrode potential are all related to the same reference potential, such as device ground of an electronic system comprising the fingerprint sensor, or another reference potential.

The first (second) peripheral finger electrode potential may be substantially constant. Further, the first (second) time-varying sensing finger electrode potential may be different from the first (second) peripheral finger electrode potential at all times, or intermittently.

It can typically be assumed that a time-varying sensing finger electrode potential applied to a set of finger electrodes will result in a time-varying potential difference between the sensing finger electrode potential and a finger potential of the finger placed on the fingerprint sensor. This is the case even when the user is not in contact with the reference potential, such as system ground, since the human body is a very large charge reservoir as compared to the charge induced by the capacitive coupling between the finger and the finger electrodes of the measuring elements in the first (second) set of sensing measuring elements.

That the first (second) peripheral measuring arrangement portion at least partly surrounds the first (second) measuring arrangement portion should be understood to mean that the first (second) peripheral measuring arrangement portion is present on at least the two long sides of the first (second) measuring arrangement portion.

The first (second) measurement value may be any value resulting from a measurement/sensing indicating a local distance to the finger surface at the measurement position.

The present invention is based on the realization that different measuring element configurations with elongated measuring arrangement portions having different principal directions of extensions can provide information that depends on the local direction of the ridges of the fingerprint pattern. This means that additional information may be obtained, which could be used to counteract the defocusing that may be encountered when performing capacitive fingerprint sensing through a thick dielectric structure, such as a cover glass.

The present inventors have further realized that the use of elongated measuring arrangement portions provides for simplified fingerprint sensor design, which may in turn reduce the time to market and increase the yield in the fingerprint sensor production process.

According to embodiments, the first measuring element configuration may further comprise: a first set of guarding measuring elements defining an elongated first guarding measuring arrangement portion having the first principal direction of extension and being adjacent to the first sensing measuring arrangement portion, the finger electrode of each measuring element in the first set of guarding measuring elements exhibiting a first guarding finger electrode potential different from the first peripheral finger electrode potential; and the second measuring element configuration may further comprise: a second set of guarding measuring elements defining an elongated second guarding measuring arrangement portion having the second principal direction of extension and being adjacent to the second sensing measuring arrangement portion, the finger electrode of each measuring element in the second set of guarding measuring elements exhibiting a second guarding finger electrode potential different from the second peripheral finger electrode potential.

The present inventors have found that the use of first and second sets of guarding measuring elements can be used to control the electrical interaction between the sensing measuring element(s) and the finger, so that the finger area influencing the first (second) measurement value(s) can be reduced. Accordingly, the provision of first and second sets of guarding measuring elements as described herein provide for a sharper fingerprint image output from the fingerprint sensor. The optimum first (second) guarding finger electrode potential will mainly depend on the dimensions and electrical properties of the dielectric structure between the finger electrodes and finger surface. In particular, the selection of first (second) guarding finger electrode potential may involve a trade-off between focusing and signal strength.

To even further improve the fingerprint representation that can be determined based on the measurement values based on signals from the fingerprint sensor, the first measuring element configuration may further comprise: a third set of guarding measuring elements defining an elongated third guarding measuring arrangement having the first principal direction of extension and being adjacent to the first set of guarding measuring elements, the finger electrode of each measuring element in the third set of guarding measuring elements exhibiting a third guarding finger electrode potential different from the first guarding finger electrode potential and different from the first peripheral finger electrode potential; and the second measuring element configuration may further comprise: a fourth set of guarding measuring elements defining an elongated fourth guarding measuring arrangement having the second principal direction of extension and being adjacent to the second set of guarding measuring elements, the finger electrode of each measuring element in the fourth set of guarding measuring elements exhibiting a fourth guarding finger electrode potential different from the second guarding finger electrode potential and different from the second peripheral finger electrode potential.

Using additional third and fourth sets of guarding measuring elements, the finger area influencing the first (second) measurement value(s) can be even further reduced, providing for a sharper fingerprint image.

According to various embodiments of the invention, the first sensing finger electrode potential may be time-varying in relation to the first peripheral finger electrode potential in such a way that a potential difference between the first sensing finger electrode potential and the first peripheral finger electrode potential changes from a first potential difference at a first point in time to a second potential difference at a second point in time; and the second sensing finger electrode potential may be time-varying in relation to the second peripheral finger electrode potential in such a way that a potential difference between the second sensing finger electrode potential and the second peripheral finger electrode potential changes from a third potential difference at a third point in time to a fourth potential difference at a fourth point in time.

Furthermore, each measuring element in the plurality of measuring elements may comprise charge amplifier circuitry controllable to provide a sensing signal indicative of a charge on the finger electrode of the measuring element.

In these embodiments, the step of acquiring the first measurement value may comprise sampling a first sensing signal provided by the charge amplifier circuitry comprised in a measuring element in the first set of sensing measuring elements at the first point in time, and sampling the first sensing signal at the second point in time; and the step of acquiring the second measurement value may comprise sampling a second sensing signal provided by the charge amplifier circuitry comprised in a measuring element in the second set of sensing measuring elements at the third point in time, and sampling the second sensing signal at the fourth point in time.

By taking the difference between the sampled values before and after the change in potential difference, the influence of common mode noise can be reduced.

According to various embodiments, the first measurement value may be based on a signal acquired from a single measuring element, in the first set of measuring elements, arranged at the measurement position; and the second measurement value may be based on a signal acquired from a single measuring element, in the second set of measuring elements, arranged at the measurement position.

In these embodiments, each measurement position typically corresponds to a position of a measuring element in the 2D measuring arrangement.

According to other embodiments, the first measurement value may be based on a difference between signals from mutually adjacent measuring elements, in the first set of measuring elements; and the second measurement value may be based on a difference between signals from mutually adjacent measuring elements, in the second set of measuring elements.

In these embodiments, using differential measurement techniques, each measurement position typically corresponds to a position between the above mentioned mutually adjacent measuring elements.

Moreover, the first measurement value may be acquired, using the first measuring element configuration, simultaneously for a plurality of measurement positions included in the first measuring arrangement portion; and the second measurement value may be acquired, using the second measuring element configuration, simultaneously for a plurality of measurement positions included in the second measuring arrangement portion.

In these embodiments the first (second) measurement value may be based on a large number (such as tens or hundreds) of sensing operations, which can substantially improve the signal-to-noise ratio of the measurement.

According to embodiments, for each measurement position in the plurality of measurement positions, the step of determining the combined measurement value for the measurement position may further comprise the step of: estimating a fingerprint ridge direction at the measurement position, wherein the combined measurement value is further based on the estimated fingerprint ridge direction. Basing the combined measurement value on the estimated fingerprint ridge direction may provide for a further improved combined fingerprint pattern representation.

Furthermore, for each measurement position in the plurality of measurement positions, the step of determining the combined measurement value for the measurement position may further comprise the steps of: assigning a first weight factor to the first measurement value and a second weight factor to the second measurement value, based on the fingerprint ridge direction in relation to the first principal direction of extension and the second principal direction of extension; and determining the combined measurement value as a weighted sum of the first measurement value and the second measurement value, using the first weight factor and the second weight factor.

Advantageously, the first weight factor may be greater than the second weight factor, for measurement positions where the fingerprint ridge direction is closer to the first principal direction than to the second principal direction.

According to a second aspect of the present invention, there is provided a fingerprint sensing system comprising: a two-dimensional measuring arrangement including a plurality of measuring elements, each measuring element in the plurality of measuring elements comprising a finger electrode; measurement control circuitry; and image processing circuitry, wherein the measuring arrangement is configurable, by the measurement control circuitry, in: a first measuring element configuration comprising: a first set of sensing measuring elements defining a first measuring arrangement portion having a first principal direction of extension, the finger electrode of each measuring element in the first set of sensing measuring elements exhibiting a first sensing finger electrode potential; and a first set of peripheral measuring elements defining a first peripheral measuring arrangement portion at least partly surrounding the first measuring arrangement portion, the finger electrode of each measuring element in the first set of peripheral measuring elements exhibiting a first peripheral finger electrode potential different from the first sensing finger electrode potential; and a second measuring element configuration comprising: a second set of sensing measuring elements defining a second measuring arrangement portion having a second principal direction of extension, the finger electrode of each measuring element in the second set of sensing measuring elements exhibiting a second sensing finger electrode potential; and a second set of peripheral measuring elements defining a second peripheral measuring arrangement portion at least partly surrounding the second measuring arrangement portion, the finger electrode of each measuring element in the second set of peripheral measuring elements exhibiting a second peripheral finger electrode potential different from the second sensing finger electrode potential.

The measurement control circuitry and the image processing circuitry may be implemented in hardware, software or a combination of hardware and software. Furthermore, the two-dimensional measuring arrangement may be included in a fingerprint sensor component, and at least a portion of the measurement control circuitry and/or the image processing circuitry may be included in such a fingerprint sensor component. For instance, the measuring arrangement and the measurement control circuitry may be included in the fingerprint sensor component, and the image processing circuitry may be at least partly provided external from the fingerprint sensor component.

According to various embodiments, each measuring element in the measuring arrangement may comprises: a charge amplifier comprising: a first input; a second input; an output capacitively coupled to the first input; and at least one amplifier stage between the first and second inputs, and the output.

The fingerprint sensing system according to various embodiments of the present invention may, moreover, advantageously be included in an electronic device further comprising processing circuitry configured to: acquire the representation of the fingerprint pattern from the fingerprint sensing system; authenticate a user based on the representation; and perform at least one user-requested process only if the user is authenticated based on the representation. The electronic device may, for example, be a handheld communication device, such as a mobile phone or a tablet, a computer, or an electronic wearable item such as a watch or similar.

Further embodiments of, and effects obtained through this second aspect of the present invention are largely analogous to those described above for the first aspect of the invention.

In summary, the present invention relates to a method of determining a representation of a fingerprint pattern of a finger using a fingerprint sensor comprising a two-dimensional measuring arrangement including a plurality of measuring elements, each comprising a finger electrode spaced apart from the finger by a dielectric structure. For each measurement position, the method comprises the steps of: providing a first measuring element configuration with an elongated first measuring arrangement portion having a first principal direction of extension; and a first peripheral measuring arrangement portion; acquiring a first measurement value for the measurement position; providing a second measuring element configuration having an elongated second measuring arrangement portion having a second principal direction of extension; and a second peripheral measuring arrangement portion; and acquiring a second measurement value for the measurement position. The representation of the fingerprint pattern is determined based on the first measurement value and the second measurement value for each of the measurement positions.

BRIEF DESCRIPTION OF THE DRAWINGS

These and other aspects of the present invention will now be described in more detail, with reference to the appended drawings showing an example embodiment of the invention, wherein:

FIG. 3B is a schematic cross-section view of a portion of the fingerprint sensing system in FIG. 3A;

DETAILED DESCRIPTION OF EXAMPLE EMBODIMENTS

In the present detailed description, various embodiments of the fingerprint sensing system and method according to the present invention are mainly described with reference to a fingerprint sensing system and method in which the elongated first measuring arrangement portion is a column (or part of a column), and the elongated second measuring arrangement portion is a row (or part of a row).

It should be noted that this by no means limits the scope defined by the appended claims, which equally well includes, for example, fingerprint sensing systems or methods in which either or both of the elongated first and second measuring arrangement portions is/are oriented differently, or where the elongated first and second measuring arrangement portions are not perpendicular to each other.

Figure 1:
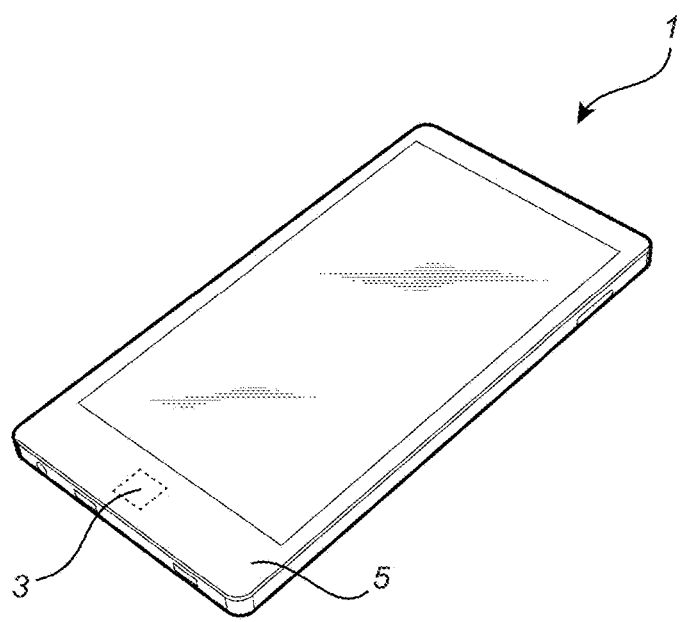
FIG. 1 schematically shows an electronic device comprising a capacitive fingerprint sensor under a cover glass.

FIG. 1 schematically illustrates an application for a fingerprint sensing device according to an example embodiment of the present invention, in the form of a mobile phone 1 with an integrated fingerprint sensing system 3. The fingerprint sensing system 3 may, for example, be used for unlocking the mobile phone 1 and/or for authorizing transactions carried out using the mobile phone, etc. As is schematically indicated in FIG. 1, the fingerprint sensing system 3 is arranged under a cover glass 5 of the mobile phone, which may, for instance be in the range of 0.2-0.4 mm thick.

Figure 2A:
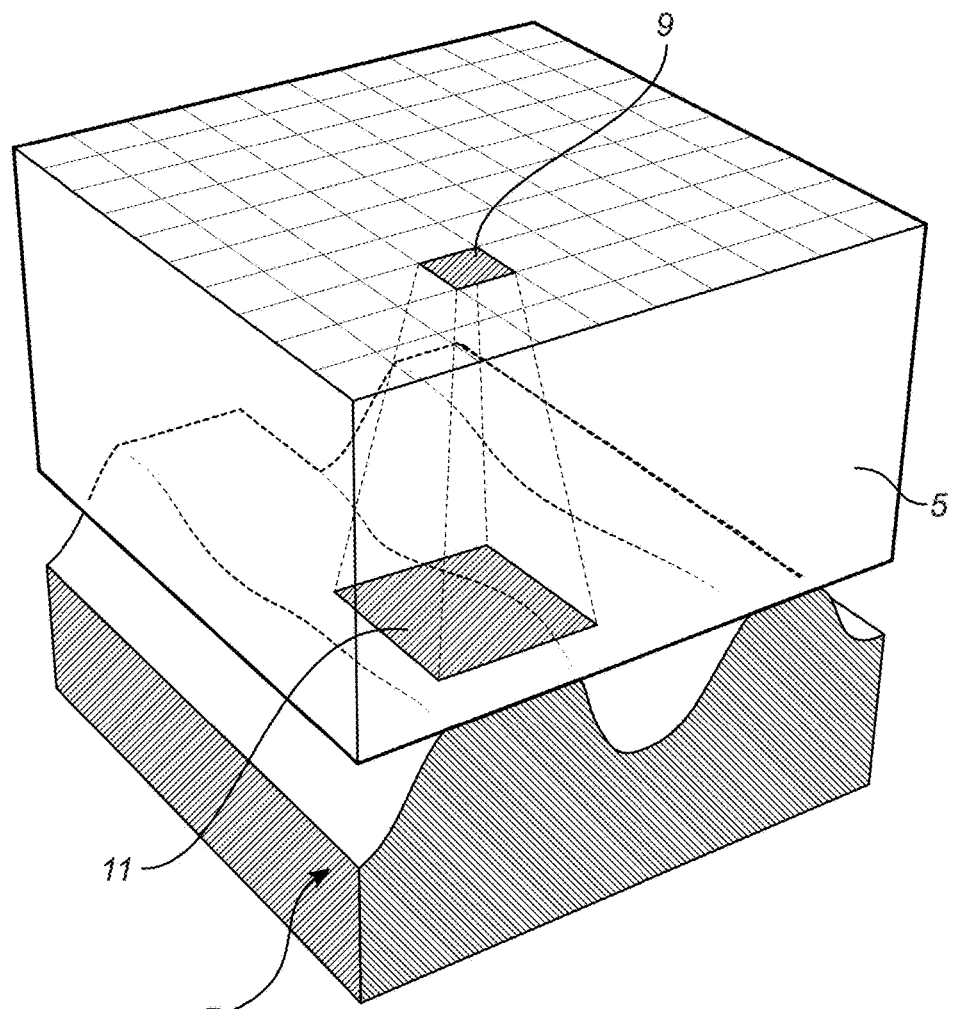
FIG. 2A is a schematic illustration of the portion of the finger surface imaged by a single sensing element using a known capacitive sensing technique.

FIG. 2A is a perspective view of a portion of a finger surface 7 in contact with the cover glass 5 in FIG. 1. On the sensor side of the cover glass 5 in FIG. 2A, areas corresponding to the measuring elements 9 of the fingerprint sensor are schematically indicated. The dimensions of the cover glass 5, the finger surface 7, and the measuring element 9 areas in FIG. 2A are approximately to scale.

In conventional fingerprint sensing system applications, where the dielectric structure covering the sensor surface is rather thin, such as about 0.1 mm or less, the area of the finger surface sensed by a given measuring element is not very different from the area of the measuring element. This also applies to known fingerprint sensing configurations where a protective structure (such as sapphire) with dielectric anisotropy and/or a very high dielectric constant is used.

With thicker dielectric protective coatings (in particular coatings that to not exhibit dielectric anisotropy and/or a very high dielectric constant), known capacitive measurement techniques will perform spatial averaging with every measuring element, as is schematically indicated in FIG. 2A, where the finger area 11 sensed by a given measuring element 9 is schematically indicated.

With known capacitive measurement techniques, this spatial averaging will result in a blurry or defocused fingerprint image.

Figure 2B:
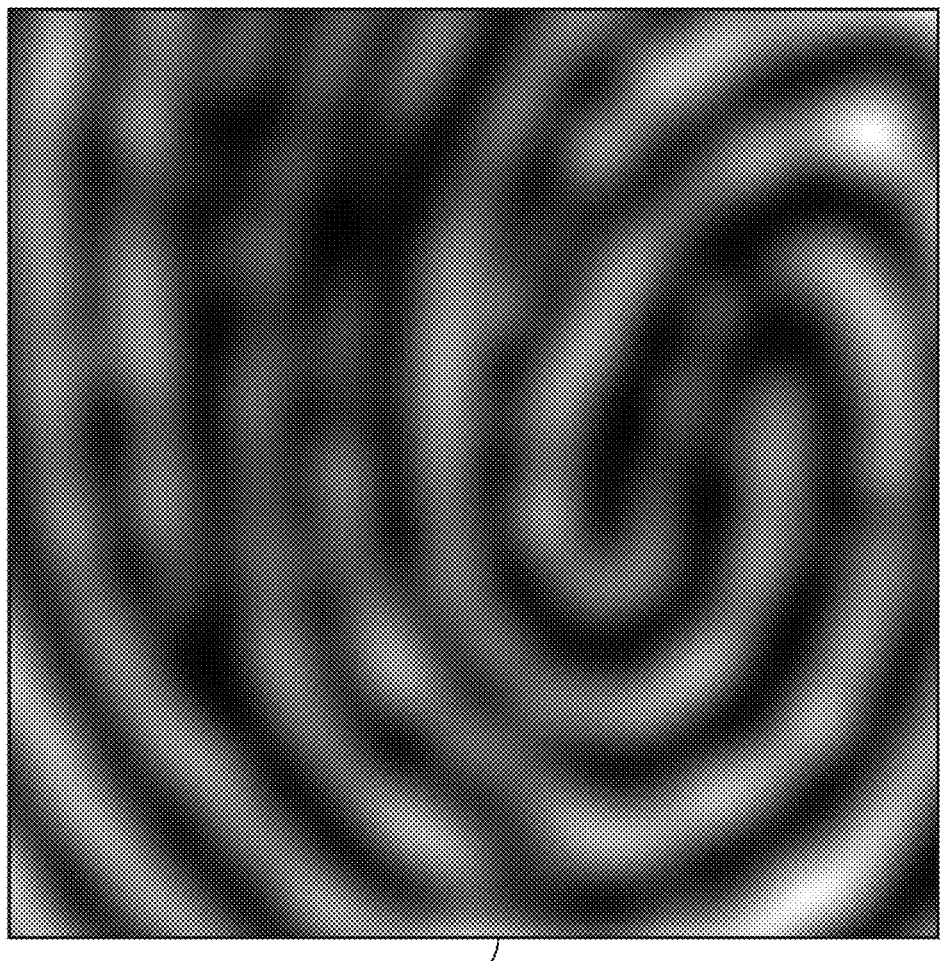
FIG. 2B is an illustration of an example simulated fingerprint image resulting from the sensing configuration in FIG. 2A using a known capacitive sensing technique.

An example of such a blurry fingerprint image 12 is shown in FIG. 2B, which is the result of a simulation of the sensing configuration in FIG. 2A using a known capacitive sensing technique.

Figure 3A:
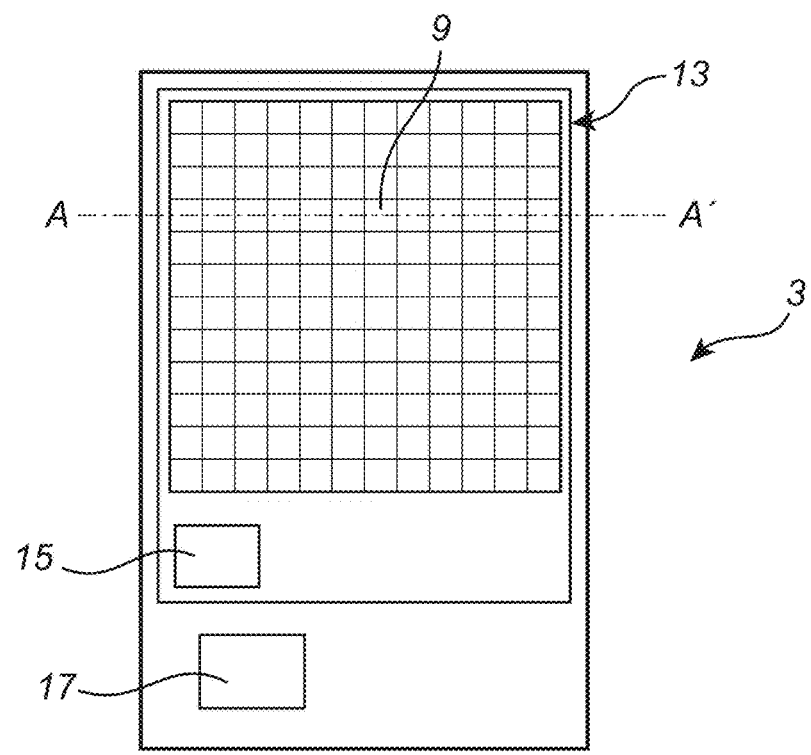
FIG. 3A is a schematic block diagram of a fingerprint system according to an embodiment of the present invention.

FIG. 3A is a schematic block diagram of a fingerprint system 3 according to an embodiment of the present invention. Referring to FIG. 3A, the fingerprint sensing system 3 according to this example embodiment of the invention comprises a two-dimensional measuring arrangement 13, including a plurality of measuring elements 9, measurement control circuitry in the form of a sensor controller 15, and image processing circuitry in the form of an image processor 17. The measuring elements 9 will be described in greater detail below with reference to FIG. 3B, which is a circuit schematic cross-section view of a portion of the measuring arrangement 13 in the section indicated by the line A-A' in FIG. 2A.

In this context, it should be noted that the illustration in FIG. 3A is schematic and simplified. In an actual fingerprint sensing system according to embodiments of the present invention, the measuring arrangement would typically comprise a considerably larger number of measuring elements. Furthermore, a typical pitch of the array of measuring elements may be around 50 µm, for a 500 pixel per inch sensor.

Furthermore, the fingerprint sensing system 3 is here schematically indicated as a single component, or a system in a package. It should, however, be understood that the functionality of the fingerprint sensing system 3 may be distributed among several components and/or software modules, such as a fingerprint sensor component and a host processor, which may be a so-called trusted element, or a so-called secure element. The functionality of the fingerprint sensing system 3 may also be partly distributed between such a trusted element and such a secure element.

FIG. 3B is a schematic cross-section view of a portion of the fingerprint sensing system in FIG. 3A, with a finger 7 placed on top of the measuring arrangement 13. The measuring arrangement 13 comprises a plurality of measuring elements 9a-c.

As is schematically shown in FIG. 3B, each measuring element 9a-c (reference numerals are only indicated for one of the measuring elements to avoid cluttering the drawings) comprises a protective dielectric top layer 5, a conductive finger electrode 19 underneath the protective dielectric top layer 5, a charge amplifier 21, selection circuitry, here functionally illustrated as a simple selection switch 23 for allowing acquisition of a measurement value from the measuring element 9a-c, and finger electrode potential providing circuitry 25 for controllably providing a selected electrical potential (constant or time-varying) to the finger electrode 19 as will be described in greater detail further below.

The charge amplifier 21 comprises at least one amplifier stage, here schematically illustrated as an operational amplifier (op amp) 27 having a first input (negative input) 29 connected to the finger electrode 19, a second input (positive input) 31 connected to the finger electrode potential providing circuitry 25, and an output 33. In addition, the charge amplifier 21 comprises a feedback capacitor 35 connected between the first input 29 and the output 33, and reset circuitry, here functionally illustrated as a switch 37, for allowing controllable discharge of the feedback capacitor 35. The charge amplifier 21 may be reset by operating the reset circuitry 37 to discharge the feedback capacitor 35.

As is often the case for an op amp 27, the electrical potential at the first input 29 follows the electrical potential applied to the second input 31. Depending on the particular amplifier configuration, the potential at the first input 29 may be substantially the same as the potential at the second input 31, or there may be a substantially fixed offset between the potential at the first input 29 and the potential at the second input 31.

Using the finger electrode potential providing circuitry 25, a desired electrical potential, which may be time-varying or substantially constant in relation to a reference potential, can be provided to the finger electrode.

The finger electrode potential providing circuitry 25 may, for instance, be implemented as a number of controllable switches for controllably connecting the second input 31 to a selected voltage line carrying the desired electrical potential to be provided to the finger electrode.

Through control of the finger electrode potential providing circuitry 25, the finger electrode 19 can thus be provided with a chosen potential depending on the desired function of the particular measuring element 9 as will be described in greater detail further below.

When a given measuring element, say the center measuring element 9b in FIG. 3B, is to function as a sensing measuring element, capable of providing a measurement value indicating the local distance between the finger electrode 19 and the surface of the finger 7, the finger electrode potential providing circuitry 25 is controlled to provide a time-varying sensing finger electrode potential to the second input 31.

In FIG. 3B, the finger 7 is schematically indicated as being "grounded". It should be understood that the finger "ground" may be different from the sensor ground. For instance, the finger 7 may be at the ground potential of the electronic device 1 in which the fingerprint sensing system 3 is included. Alternatively, the body may be considered to have such a large electrical "mass" that the potential of the finger remains substantially constant when the potential of the finger electrode 19 varies.

The provision of a time-varying finger electrode potential to the finger electrode 19 results in a time-varying potential difference between the finger electrode 19 and the finger 7.

As will be described in more detail further below, the above-described change in potential difference between the finger electrode 19 and the finger 7 results in a sensing signal Vs on the output 33 of the charge amplifier 21.

When the indicated sensing element 9b is thus controlled to be a sensing measuring element, the selection switch 23 is closed to connect the output 33 of the charge amplifier 21 to the readout line 39. The readout line 39, which may be a common readout line for a row or a column of the 2D measuring arrangement 13, is shown in FIG. 3B to be connected to a multiplexer 41. As is schematically indicated in FIG. 3B, additional readout lines providing sensing signals from other rows/columns of the measuring arrangement 13 are also connected to the multiplexer 41.

The sensing signals Vs from the sensing measuring element 9b are demodulated by sample-and-hold circuitry 43. The output of the sample-and-hold circuitry 43 is connected to an analog-to-digital converter 45 for converting the analog DC voltage signals output by the sample-and-hold circuitry to a digital representation of the measurement value for each selected sensing measuring element 9b.

Having now introduced an embodiment of the fingerprint sensing system of the present invention, an embodiment of the method according to the present invention will be described below with reference to the flow-chart in FIG. 4, and additional illustrations where indicated.

Through the method according to embodiments of the present invention, a representation of a fingerprint pattern of a finger is determined using measurement values for each of a plurality of measurement positions.

Figure 4:
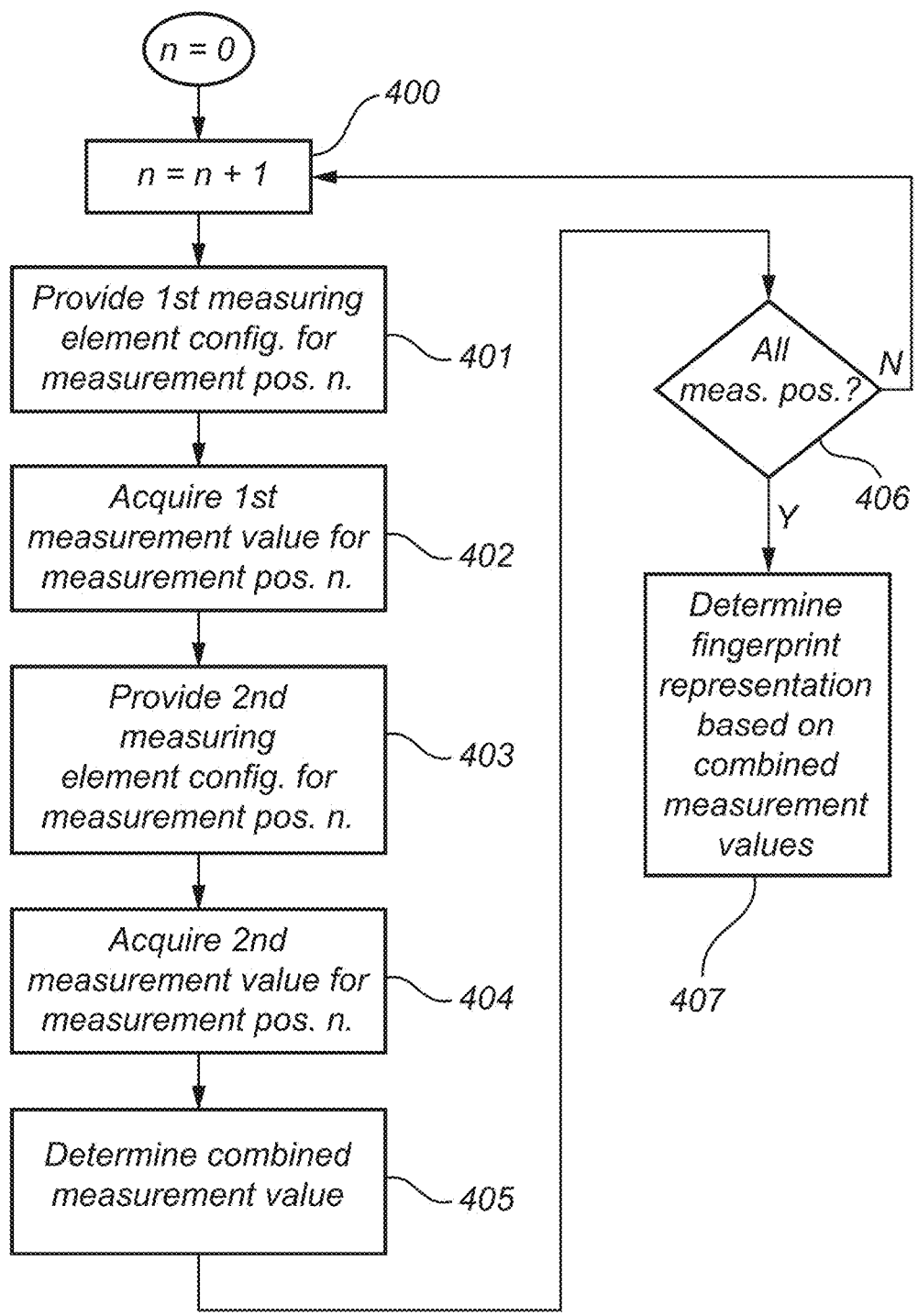
FIG. 4 is a flow-chart illustrating a method according to an embodiment of the present invention.

As is indicated in FIG. 4, a counter for the measurement position number n is initially set to n=0. In the first step 400, the counter is incremented by one.

Figure 5A:
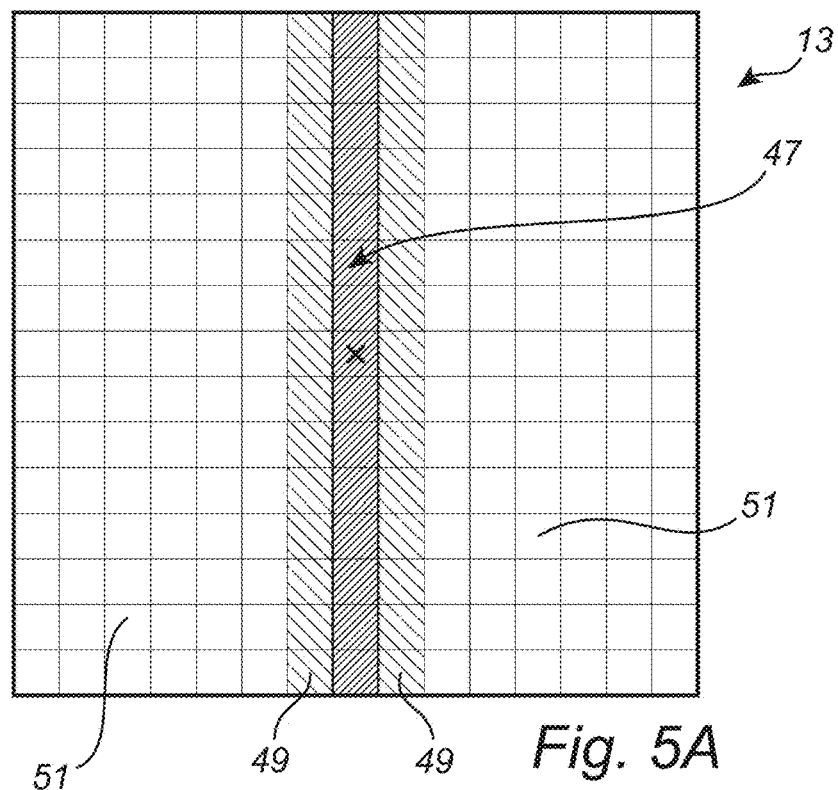
FIG. 5A schematically illustrates a first example of a first measuring element configuration.

For the $n^{th}$ measurement position, a first measuring element configuration is provided in step 401. Referring to FIG. 5A, the first measuring element configuration comprises a first set of sensing measuring elements defining an elongated first measuring arrangement portion 47, a first set of guarding measuring elements defining an elongated first guarding measuring arrangement portion 49, and a first set of peripheral measuring elements defining a first peripheral measuring arrangement portion 51. As is schematically indicated in FIG. 5A, the first guarding measuring arrangement portion 49 at least partly surrounds the first measuring arrangement portion 47, and the first peripheral measuring arrangement portion 51 at least partly surrounds the first guarding measuring arrangement portion 49.

The first measuring arrangement portion 47 includes measurement position n, indicated by an 'x' in FIG. 5A, and has a first principal direction of extension, which is here indicated as being along the columns of the measuring arrangement 13. Although the first measuring arrangement portion 47 is here indicated at being formed by a single complete column of sensing measuring elements, it should be noted that the first measuring arrangement portion may be shorter and/or may have a different principal direction of extension.

The first guarding measuring arrangement portion 49 is indicated in FIG. 5A as comprising the columns directly neighboring the first measuring arrangement portion 47. It should, however, be noted that the first guarding measuring arrangement portion 49 may be more than one measuring element "wide".

The first peripheral measuring arrangement portion 51 is indicated in FIG. 5A as constituting the remainder of the surface area of the measuring arrangement 13. This may not necessarily be the case, but the first peripheral measuring arrangement portion 51 may occupy a smaller fraction of the surface area of the measuring arrangement 13.

Referring briefly additionally to FIG. 3B, the finger electrode of each measuring element in the first set of measuring elements exhibits a first time-varying sensing finger electrode potential. This may, as was described further above in connection with FIG. 3B, be achieved by controlling the finger electrode potential providing circuitry 25 to provide a desired time-varying potential to the second input 31 of the charge amplifier 21.

Considering first that all of the measuring elements 9a-c in FIG. 3B are comprised in the first set of sensing measuring elements, then the finger electrode potential circuitry 25 of each of the measuring elements 9a-c are controlled to provide the same first time-varying sensing finger electrode potential to the finger electrodes 19 of the measuring elements 9a-c.

Returning to FIG. 5A, the finger electrode of each measuring element in the first set of peripheral measuring elements exhibits a first peripheral finger electrode potential that is different from the first time-varying sensing finger electrode potential. For instance, the first peripheral finger electrode potential may be substantially constant in relation to a system ground potential. In embodiments, the finger electrode potential providing circuitry 25 in FIG. 3B may, for example, be controlled to provide a ground potential for the fingerprint sensor to the second input 31 of the charge amplifier 21, resulting in the finger electrode 19 exhibiting a constant potential at or close to sensor ground.

Finally, the finger electrode of each measuring element in the first set of guarding measuring elements exhibits a first guarding finger electrode potential that is different from the above-mentioned first peripheral finger electrode potential. For improved focusing effect, the first guarding finger electrode potential may also be different from the first time-varying sensing finger electrode potential. Moreover, the first measuring element configuration may comprise additional sets of guarding measuring elements between the first guarding measuring arrangement portion 49 and the first peripheral measuring arrangement portion 51.

As described above for the peripheral measuring elements in the first set of peripheral measuring elements, the finger electrode potential providing circuitry 25 in the measuring elements assigned as guarding measuring elements may, for example, be controlled to provide a substantially constant first guard potential to the second input 31 of the charge amplifier 21, resulting in the finger electrode 19 of the guarding measuring elements in the first set of guarding measuring elements exhibiting a constant guarding potential different from each of the time-varying first sensing finger electrode potential and the first peripheral finger electrode potential.

Using the first measuring element configuration described above, a first measurement value for measurement position n is acquired in step 402. In embodiments, the first measurement value may be acquired using only a single sensing measuring element, by selecting only one sensing measuring element 9b in the set of sensing measuring elements for readout as is schematically indicated in FIG. 3B by the selection switch 23. Alternatively, first measurement values may be acquired from several sensing measuring elements 9a-c simultaneously, by simultaneously closing the selection switches 23 for some or all of the sensing measuring elements in the first set of sensing measuring elements. In the latter case, several first measurement values may be acquired for each measurement position, which provides for an improved signal to noise ratio through signal integration.

Figure 5B:
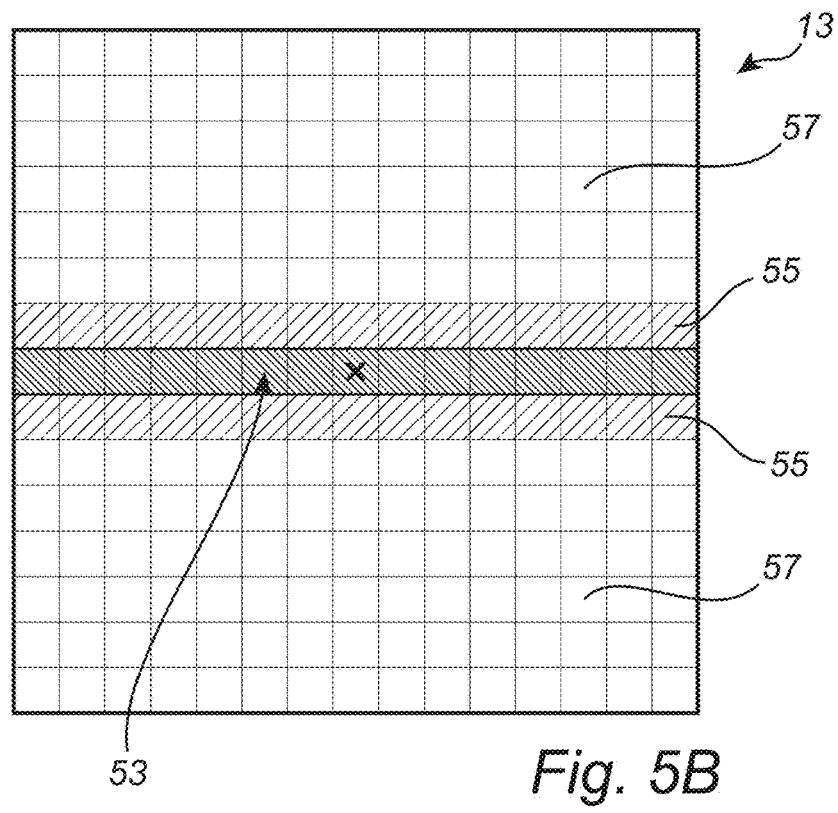
FIG. 5B schematically illustrates a first example of a second measuring element configuration.

In the next step 403, a second measuring element configuration is provided. Referring to FIG. 5B, the second measuring element configuration comprises a second set of sensing measuring elements defining an elongated second measuring arrangement portion 53, a second set of guarding measuring elements defining an elongated second guarding measuring arrangement portion 55, and a second set of peripheral measuring elements defining a second peripheral measuring arrangement portion 57. As is schematically indicated in FIG. 5B, the second guarding measuring arrangement portion 55 at least partly surrounds the second measuring arrangement portion 53, and the second peripheral measuring arrangement portion 57 at least partly surrounds the second guarding measuring arrangement portion 55.

The second measuring arrangement portion 53, like the above-described first measuring arrangement portion includes measurement position n, indicated by an 'x' in FIG. 5B, and has a second principal direction of extension, which is here indicated as being along the rows of the measuring arrangement 13. The further description and discussion above concerning the first measuring arrangement configuration also applies to the second measuring arrangement configuration, and will not be repeated here for the sake of brevity.

As described above for the first measuring arrangement configuration, a second measurement value for measurement position n is acquired in step 404, using the second measuring arrangement configuration.

Thereafter, in step 405, a combined measurement value is determined for measurement position n based on the first measurement value acquired using the first measuring element configuration, and the second measurement value acquired using the second measuring element configuration.

In the next step 406, it is determined if first and second measurement values have been acquired, and a combined measurement value has been determined for each measurement position. If this is not the case, the method returns to step 400 where the counter is incremented to the next measurement position. If, on the other hand, first and second measurement values have been acquired for all measurement positions, and combined measurement values have been determined, a representation of the fingerprint pattern is determined in step 407, based on the combined measurement values.

It should be noted that the flow-chart in FIG. 4 illustrates one possible embodiment of the method according to the invention. According to embodiments, a complete first fingerprint representation may be determined using the first measuring element configuration for each measurement position, and a complete second fingerprint representation may be determined using the second measuring element configuration for each measurement position. A complete combined fingerprint representation may then be determined based on the first and second fingerprint representations.

Figure 6A:
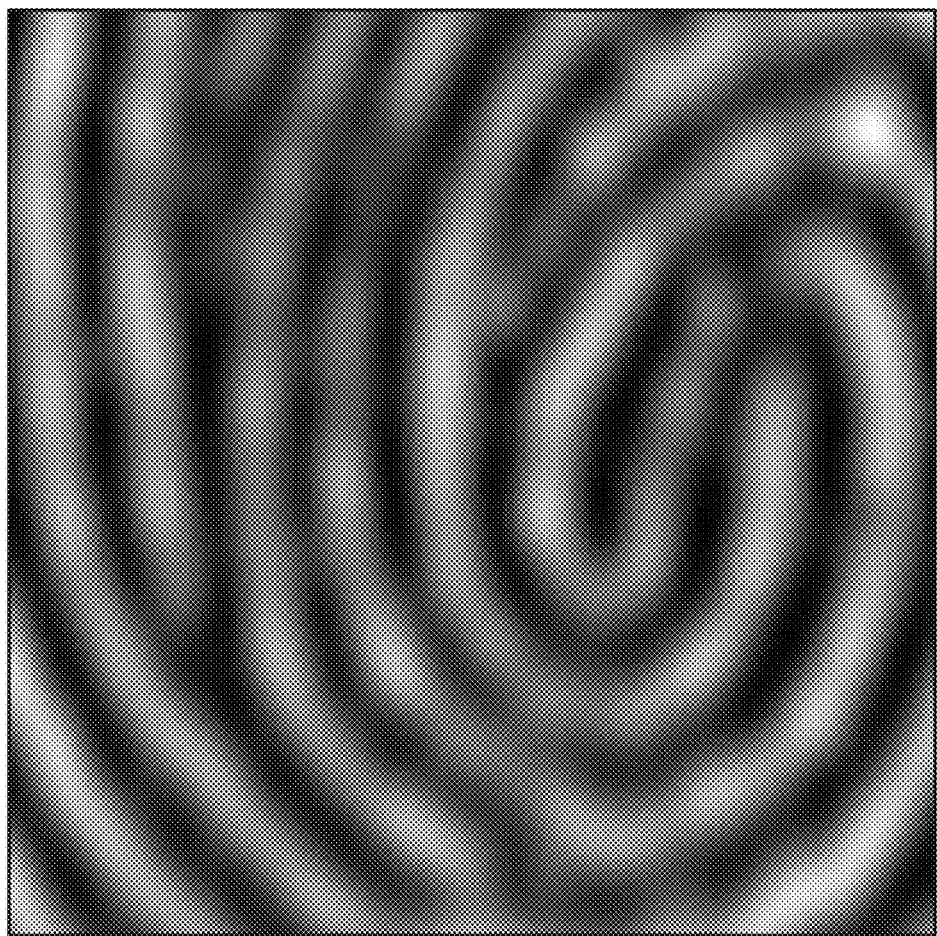
FIG. 6A is an illustration of an example fingerprint image resulting from the measuring element configuration in FIG. 5A in which the finger electrodes are separated from the user's finger by a 300 µm cover glass.

FIG. 6A shows a first fingerprint image 59 resulting from a simulation using the above-described first measuring arrangement configuration. Apart from the measuring arrangement configuration used, all other simulation parameters are identical to those used for the simulation resulting in the fingerprint image 12 in FIG. 2B. As is evident from a study of the first fingerprint image 59 in FIG. 6A, some portions of the first fingerprint image 59 appear relatively sharp, while other portions appear relatively blurry. In particular, portions with mainly vertical fingerprint ridges generally appear sharper than portions with mainly horizontal fingerprint ridges.

Figure 6B:
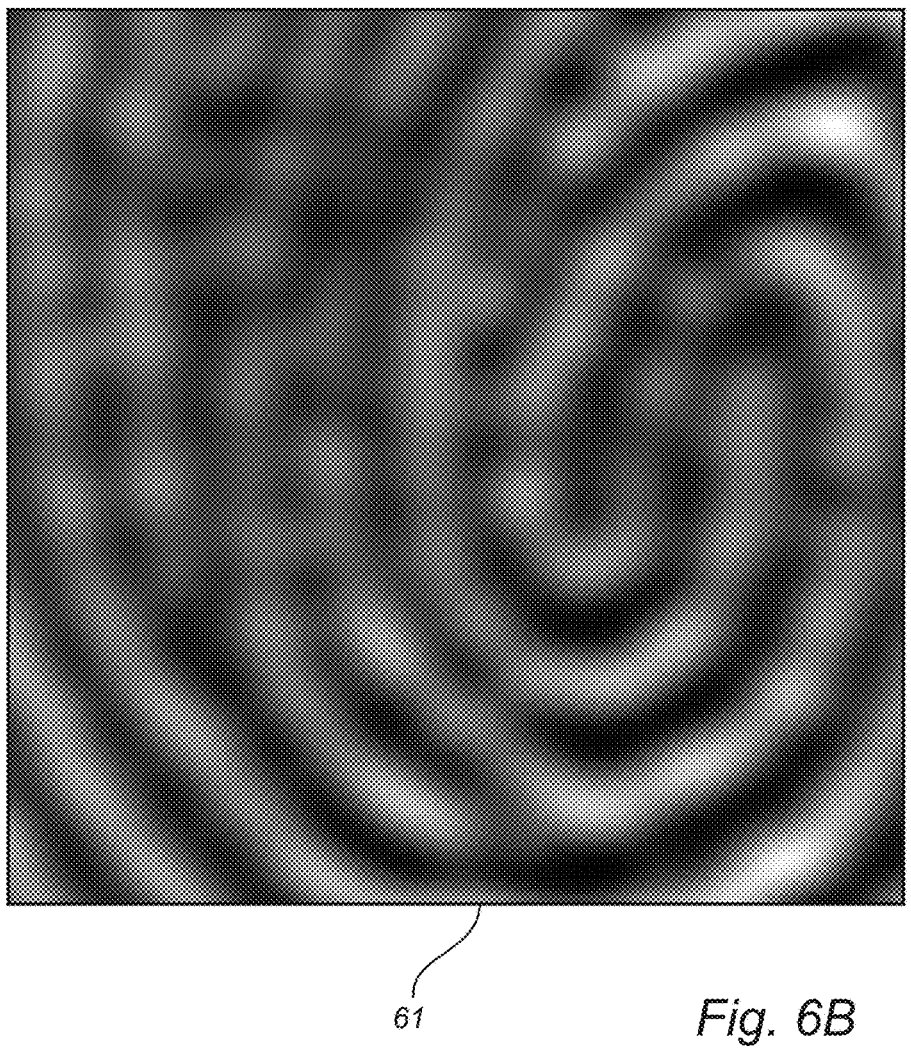
FIG. 6B is an illustration of an example fingerprint image resulting from the measuring element configuration in FIG. 5B in which the finger electrodes are separated from the user's finger by a 300 µm cover glass.

FIG. 6B shows a second fingerprint image 61 resulting from a simulation using the above-described second measuring arrangement configuration. Apart from the measuring arrangement configuration used, all other simulation parameters are identical to those used for the simulation resulting in the fingerprint image 12 in FIG. 2B. As is evident from a study of the second fingerprint image 61 in FIG. 6B, portions with mainly horizontal fingerprint ridges generally appear sharper than portions with mainly vertical fingerprint ridges.

To arrive at the desired improved representation of the fingerprint pattern, the first measurement values represented by the first fingerprint image 59 in FIG. 6A are, according to embodiments of the present invention, combined with the second measurement values represented by the second fingerprint image 61 in FIG. 6B. The combination of the first measurement values and the second measurement values, to arrive at the combined measurement values on which the improved fingerprint pattern representation is based, can be arrived at in various ways.

Figure 7A:
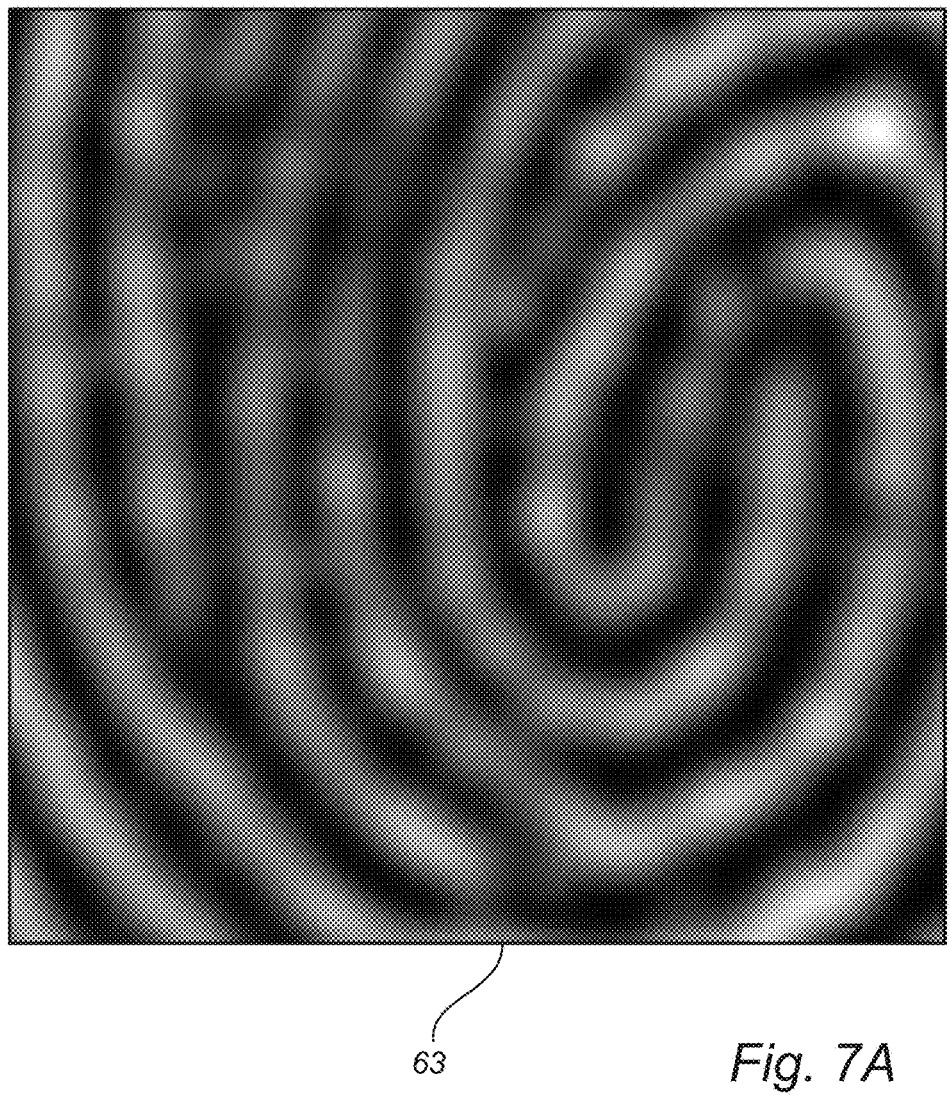
FIG. 7A is a simple pixel per pixel average of the fingerprint images in FIG. 5B and FIG. 6B.

FIG. 7A shows a combined fingerprint image 63 arrived at by combining the first measurement values (the first fingerprint image 59 in FIG. 6A) and the second measurement values (the second fingerprint image 61 in FIG. 6B) in the simplest possible way—by taking the average of the first and second measurement values for each measurement position.

Figure 7B:
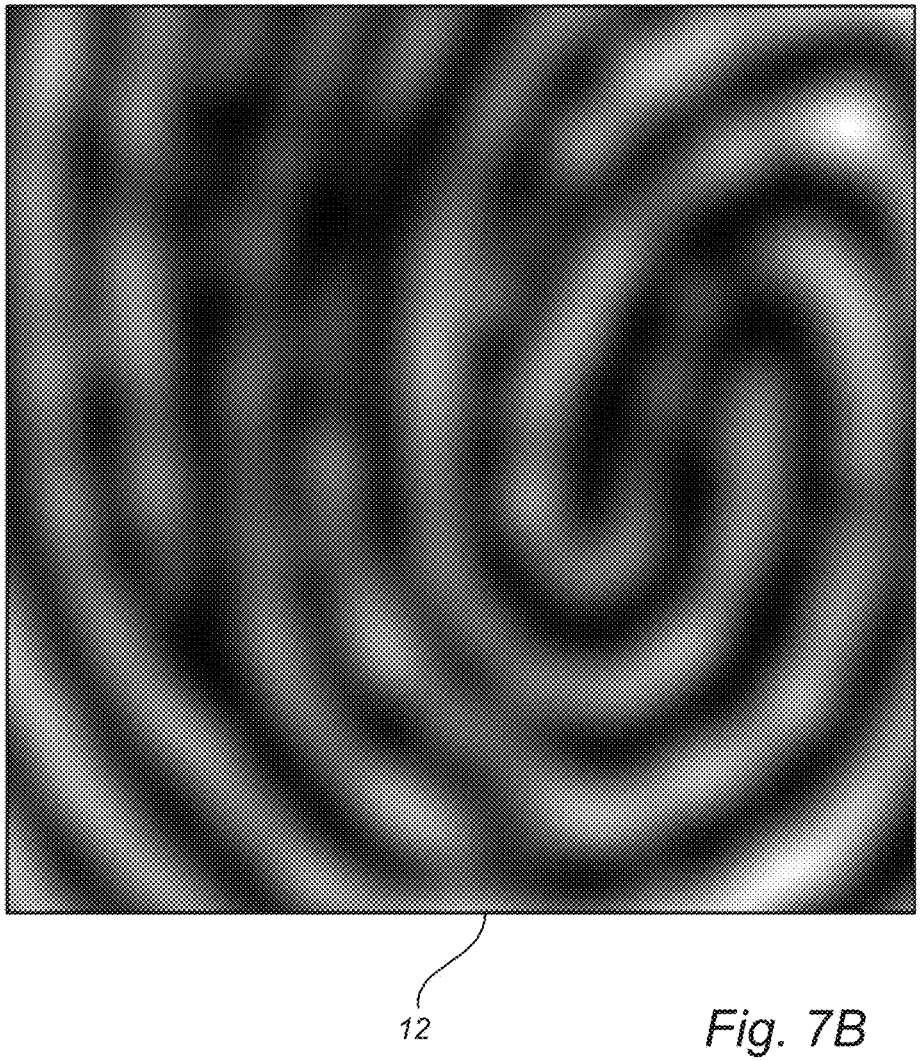
FIG. 7B is the same fingerprint image as in FIG. 2B for comparison.
Figure 8A:
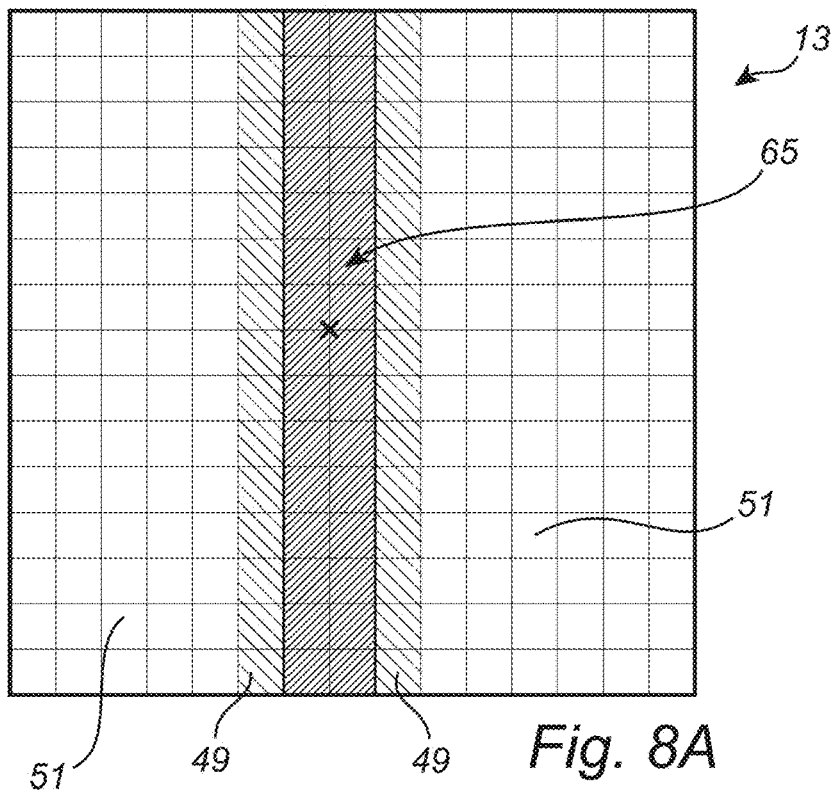
FIG. 8A schematically illustrates a second example of a first measuring element configuration.
Figure 8B:
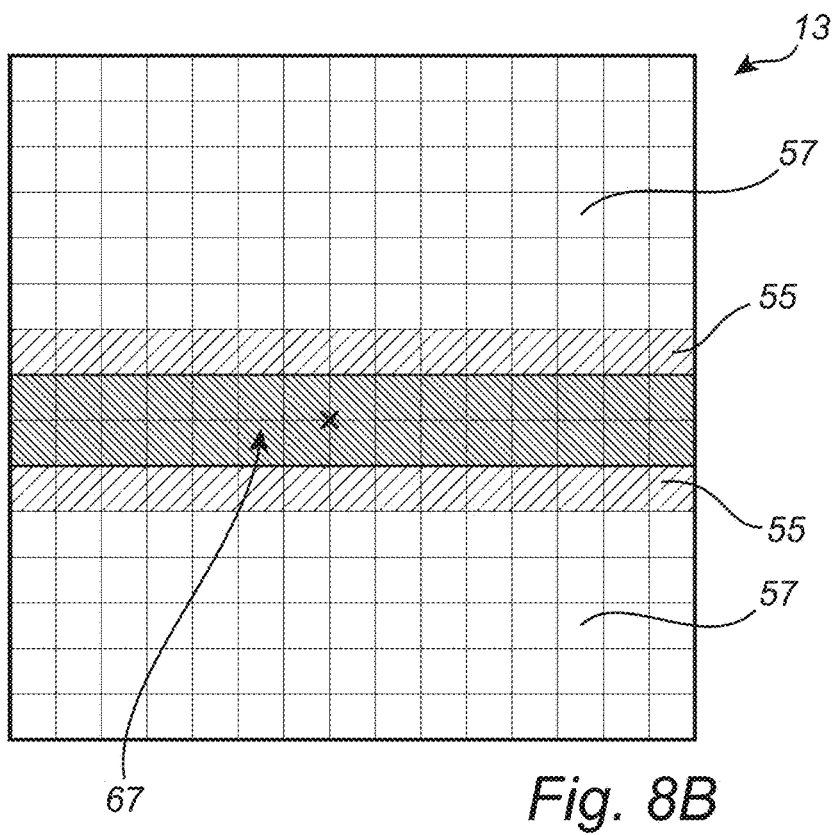
FIG. 8B schematically illustrates a second example of a second measuring element configuration.

Comparing this simple combined fingerprint image 63 with the fingerprint image 12 in FIG. 2B, which is repeated as FIG. 7B to facilitate comparison, it is clear that even the simplest combination of the first and second measurement values results in a considerably sharper simulated fingerprint image 63.

It will be evident to one of ordinary skill in the art that even better results can be obtained using a more elaborate scheme for determining the combined measurement values based on the first and second measurement values. For instance, the first and second measurement values, respectively, may be assigned weights depending on the principal local direction of the fingerprint pattern. In this manner, and in this particular example, the first measurement values may be allowed to dominate for portions in which the direction of the fingerprint pattern is at or close to the above-mentioned first principle direction, and the second measurement values may be allowed to dominate for portions in which the direction of the fingerprint pattern is at or close to the above-mentioned second principle direction.

It should be noted that a given first (second) measurement value need not necessarily directly correspond to a sensing signal obtained from a single measuring element, but that a first (second) measurement value for a particular measurement position may be based on sensing signals obtained from more than one measuring element. For instance, each measurement value may be a differential measurement value.

An example first measuring element configuration for differential measurement is schematically shown in FIG. 9A, and an example second measuring element configuration for differential measurement is schematically shown in FIG. 9B.

The first measuring element configuration in FIG. 9A mainly differs from that described above with reference to FIG. 5A in that the first measuring arrangement portion 65 is at least two measuring elements wide, and that at least two measuring elements are used to determine the first measurement value for the measurement position (indicated by 'x' in FIG. 9A) between the two measuring elements.

The second measuring arrangement portion 67 in FIG. 9B is also at least two measuring elements wide.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an"

does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope

What is claimed is:

1. A method of determining a representation of a fingerprint pattern of a finger using a fingerprint sensor comprising a two-dimensional measuring arrangement including a plurality of measuring elements, each comprising a finger electrode spaced apart from said finger by a dielectric structure, said method comprising the steps of, for each measurement position in a plurality of measurement positions:
providing a first measuring element configuration comprising:
a first set of sensing measuring elements defining an elongated first measuring arrangement portion including said measurement position and having a first principal direction of extension, the finger electrode of each measuring element in said first set of sensing measuring elements exhibiting a first time-varying sensing finger electrode potential; and
a first set of peripheral measuring elements defining a first peripheral measuring arrangement portion at least partly surrounding said first measuring arrangement portion, the finger electrode of each measuring element in said first set of peripheral measuring elements exhibiting a first peripheral finger electrode potential different from said first sensing finger electrode potential;
acquiring, using said first measuring element configuration, a first measurement value for said measurement position;
providing a second measuring element configuration comprising:
a second set of sensing measuring elements defining an elongated second measuring arrangement portion including said measurement position and having a second principal direction of extension different from said first principal direction of extension, the finger electrode of each measuring element in said second set of sensing measuring elements exhibiting a second time-varying sensing finger electrode potential; and
a second set of peripheral measuring elements defining a second peripheral measuring arrangement portion at least partly surrounding said second measuring arrangement portion, the finger electrode of each measuring element in said second set of peripheral measuring elements exhibiting a second peripheral finger electrode potential different from said second sensing finger electrode potential; and
acquiring, using said second measuring element configuration, a second measurement value for said measurement position, wherein said method further comprises the steps of:
determining a combined measurement value for each of said measurement positions based on said first measurement value and said second measurement value for each of said measurement positions; and
determining said representation of the fingerprint pattern based on said combined measurement value for each of said measurement positions.

2. The method according to claim 1, wherein:
said first measuring element configuration further comprises:
a first set of guarding measuring elements defining an elongated first guarding measuring arrangement portion having said first principal direction of extension and being adjacent to said first sensing measuring arrangement portion, the finger electrode of each measuring element in said first set of guarding measuring elements exhibiting a first guarding finger electrode potential different from said first peripheral finger electrode potential; and
said second measuring element configuration further comprises:
a second set of guarding measuring elements defining an elongated second guarding measuring arrangement portion having said second principal direction of extension and being adjacent to said second sensing measuring arrangement portion, the finger electrode of each measuring element in said second set of guarding measuring elements exhibiting a second guarding finger electrode potential different from said second peripheral finger electrode potential.

3. The method according to claim 2, wherein:
said first measuring element configuration further comprises:
a third set of guarding measuring elements defining an elongated third guarding measuring arrangement having said first principal direction of extension and being adjacent to said first set of guarding measuring elements, the finger electrode of each measuring element in said third set of guarding measuring elements exhibiting a third guarding finger electrode potential different from said first guarding finger electrode potential and different from said first peripheral finger electrode potential; and
said second measuring element configuration further comprises:
a fourth set of guarding measuring elements defining an elongated fourth guarding measuring arrangement having said second principal direction of extension and being adjacent to said second set of guarding measuring elements, the finger electrode of each measuring element in said fourth set of guarding measuring elements exhibiting a fourth guarding finger electrode potential different from said second guarding finger electrode potential and different from said second peripheral finger electrode potential.

4. The method according to claim 1, wherein:
said first sensing finger electrode potential is time-varying in relation to said first peripheral finger electrode potential in such a way that a potential difference between said first sensing finger electrode potential and said first peripheral finger electrode potential changes from being a first potential difference at a first point in time to being a second potential difference at a second point in time; and said second sensing finger electrode potential is time-varying in relation to said second peripheral finger electrode potential in such a way that a potential difference between said second sensing finger electrode potential and said second peripheral finger electrode potential changes from being a third potential difference at a third point in time to being a fourth potential difference at a fourth point in time.

5. The method according to claim 4, wherein:
each measuring element in said plurality of measuring elements comprises charge amplifier circuitry controllable to provide a sensing signal indicative of a charge on the finger electrode of said measuring element.

6. The method according to claim 5, wherein:
the step of acquiring said first measurement value comprises sampling a first sensing signal provided by said charge amplifier circuitry comprised in a measuring element in said first set of sensing measuring elements at said first point in time, and sampling said first sensing signal at said second point in time; and
the step of acquiring said second measurement value comprises sampling a second sensing signal provided by said charge amplifier circuitry comprised in a measuring element in said second set of sensing measuring elements at said third point in time, and sampling said second sensing signal at said fourth point in time.

7. The method according to claim 1, wherein said two-dimensional measuring arrangement is a measuring element array with said plurality of measuring elements arranged in rows and columns,
wherein said first principal direction of extension is parallel to said columns, and said second principal direction of extension is parallel to said rows.

8. The method according to claim 1, wherein:
said first measurement value is based on a signal acquired from a single measuring element, in said first set of measuring elements, arranged at said measurement position; and
said second measurement value is based on a signal acquired from a single measuring element, in said second set of measuring elements, arranged at said measurement position.

9. The method according to claim 1, wherein:
said first measurement value is based on a difference between signals from mutually adjacent measuring elements, in said first set of measuring elements; and
said second measurement value is based on a difference between signals from mutually adjacent measuring elements, in said second set of measuring elements.

10. The method according to claim 1, wherein:
said first measurement value is acquired, using said first measuring element configuration, simultaneously for a plurality of measurement positions included in said first measuring arrangement portion; and
said second measurement value is acquired, using said second measuring element configuration, simultaneously for a plurality of measurement positions included in said second measuring arrangement portion.

11. A fingerprint sensing system comprising:
a two-dimensional measuring arrangement including a plurality of measuring elements, each measuring element in said plurality of measuring elements comprising a finger electrode;
measurement control circuitry; and
image processing circuitry,
wherein said measuring arrangement is configurable, by said measurement control circuitry, in:
a first measuring element configuration comprising:
a first set of sensing measuring elements defining a first measuring arrangement portion having a first principal direction of extension, the finger electrode of each measuring element in said first set of sensing measuring elements exhibiting a first sensing finger electrode potential; and
a first set of peripheral measuring elements defining a first peripheral measuring arrangement portion at least partly surrounding said first measuring arrangement portion, the finger electrode of each measuring element in said first set of peripheral measuring elements exhibiting a first peripheral finger electrode potential different from said first sensing finger electrode potential; and
a second measuring element configuration comprising:
a second set of sensing measuring elements defining a second measuring arrangement portion having a second principal direction of extension, the finger electrode of each measuring element in said second set of sensing measuring elements exhibiting a second sensing finger electrode potential; and
a second set of peripheral measuring elements defining a second peripheral measuring arrangement portion at least partly surrounding said second measuring arrangement portion, the finger electrode of each measuring element in said second set of peripheral measuring elements exhibiting a second peripheral finger electrode potential different from said second sensing finger electrode potential,
wherein said measurement control circuitry is configured to:
control said measuring arrangement to acquire a first measurement value for each of said measurement positions, using said first measuring element configuration; and
control said measuring arrangement to acquire a second measurement value for each of said measurement positions, using said second measuring element configuration,
wherein said image processing circuitry is configured to:
determine a combined measurement value for each of said measurement positions based on said first measurement value and said second measurement value for each of said measurement positions; and
determine a representation of the fingerprint pattern based on said combined measurement value for each of said measurement positions.

12. The fingerprint sensing system according to claim 11, wherein:
said first measuring element configuration further comprises a first set of guarding measuring elements defining an elongated first guarding measuring arrangement portion having said first principal direction of extension and being adjacent to said first sensing measuring arrangement portion;
said measurement control circuitry is configured to control said measuring arrangement to provide a first guarding finger electrode potential different from said first peripheral finger electrode potential to the finger electrode of each measuring element in said first set of guarding measuring elements;
said second measuring element configuration further comprises a second set of guarding measuring elements defining an elongated second guarding measuring arrangement portion having said second principal direction of extension and being adjacent to said second sensing measuring arrangement portion; and said measurement control circuitry is configured to control said measuring arrangement to provide a second guarding finger electrode potential different from said second peripheral finger electrode potential to the finger electrode of each measuring element in said second set of guarding measuring elements.

13. The fingerprint sensor according to claim 12, wherein:

said first measuring element configuration further comprises a third set of guarding measuring elements defining an elongated third guarding measuring arrangement portion having said first principal direction of extension and being adjacent to said first guarding measuring arrangement portion;

said measurement control circuitry is configured to control said measuring arrangement to provide a third guarding finger electrode potential different from said first guarding finger potential and said first peripheral finger electrode potential to the finger electrode of each measuring element in said third set of guarding measuring elements;

said second measuring element configuration further comprises a fourth set of guarding measuring elements defining an elongated fourth guarding measuring arrangement portion having said second principal direction of extension and being adjacent to said second guarding measuring arrangement portion; and said measurement control circuitry is configured to control said measuring arrangement to provide a fourth guarding finger electrode potential different from said second guarding finger potential and said second peripheral finger electrode potential to the finger electrode of each measuring element in said fourth set of guarding measuring elements.

14. An electronic device, comprising:

the fingerprint sensing system according to claim 11; and processing circuitry configured to:

acquire a representation of a fingerprint pattern of a user from said fingerprint sensing system;

authenticate said user based on said representation; and perform at least one user-requested process only if said user is authenticated based on said representation.

\* \* \* \* \*